G. McARTHUR.
RIVET JAM DOLLY.
APPLICATION FILED SEPT. 17, 1915.
1,172,894.
Patented Feb. 22, 1916.
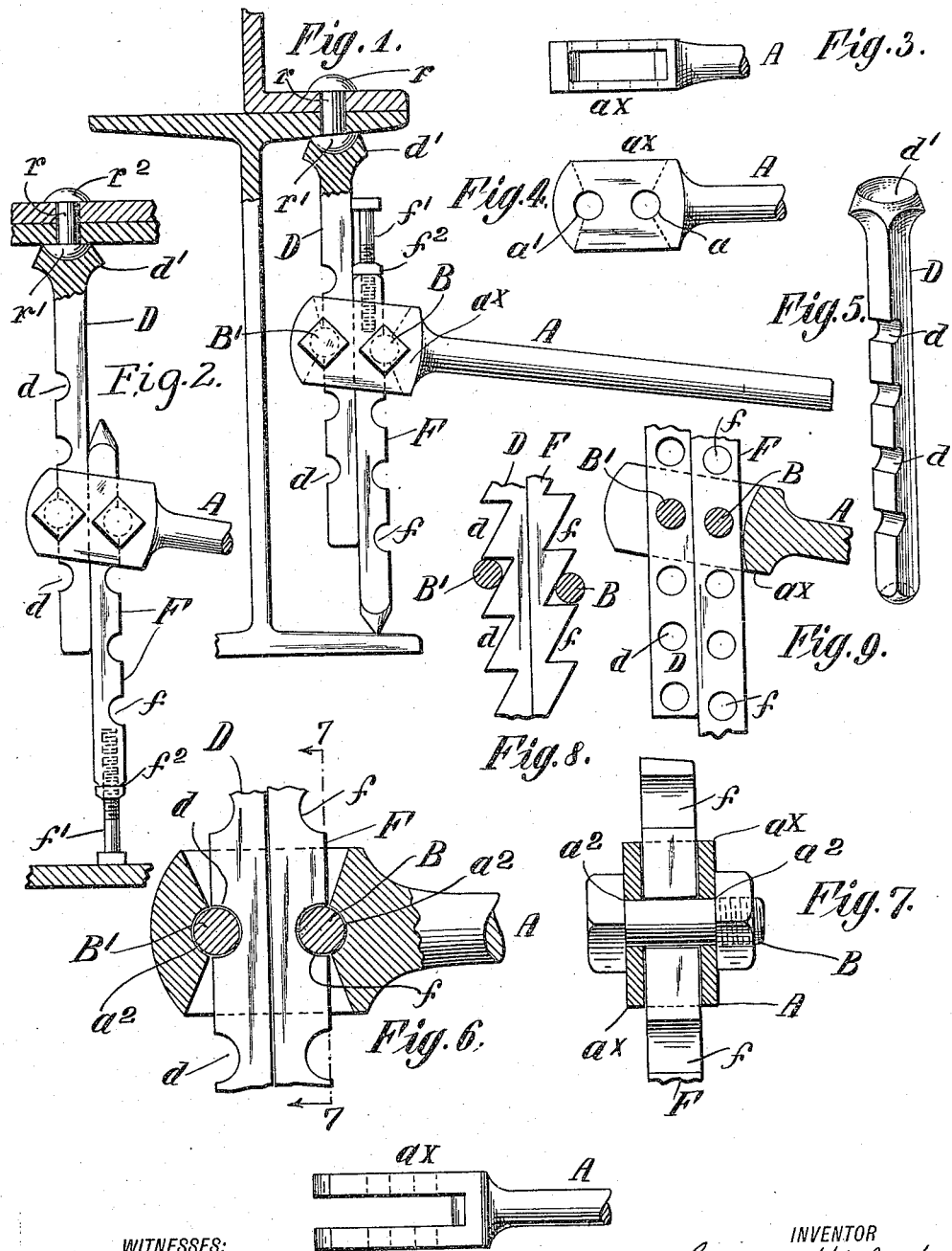
WITNESSES:
Fred. Rogers.
Dorothy Miatt
INVENTOR
George McArthur
BY
Geo. Wm Miatt
ATTORNEY

UNITED STATES PATENT OFFICE.

GEORGE McARTHUR, OF BAYONNE, NEW JERSEY.

RIVET JAM-DOLLY.

1,172,894.  Specification of Letters Patent.  Patented Feb. 22, 1916.

Application filed September 17, 1915. Serial No. 51,128.

*To all whom it may concern:*

Be it known that I, GEORGE McARTHUR, a citizen of the United States, and a resident of Bayonne, in the county of Hudson and State of New Jersey, have invented certain new and useful Improvements in Rivet Jam-Dollies, of which the following is a specification.

My invention relates to means for sustaining one end of a rivet while the other is being upset or hammered into shape, as in the assembling of metallic structures for buildings, &c., the object being to afford a tool or implement specially adapted to the purpose that may be quickly and conveniently applied and manipulated, and in which provision is made for adjusting it to the varying requirements of use, as hereinafter set forth,—the invention consisting in the specific construction and arrangement of parts described and claimed.

In the accompanying drawings, Figures 1, and 2, are sectional elevations showing the practical application and use of my new implement; Fig. 3, an edge view of the recessed head of the lever shown in Figs. 1, and 2; Fig. 4, a side elevation thereof; Fig. 5, a perspective view of the dolly bar or anvil member of the tool; Fig. 6, is a sectional elevation upon a larger scale showing a preferred construction of the recessed head of the lever; Fig. 7, is a sectional elevation taken upon plane of line 7—7 Fig. 6; Fig. 8, is a fragmentary detail showing a modification in the form of the bolt seats; Fig. 9, is a sectional elevation showing another modification of structure; Fig. 10, is an edge view of the recessed lever head shown in Fig. 9.

My new riveting tool consists essentially of a fulcrum bar F, a jam or dolly bar D, the actuating lever A, fulcrum bolt B, and movable or lifting bolt B'. These are all detachable the one from the other for adjustment, being held in position for use by the fulcrum bolt B, and the lifting bolt B', by reason of the engagement of said bolts with any of a series of seats on the dolly bar D, and fulcrum bar F. These seats may consist of the side walls of semi-circular or annular recesses $d$, $f$, as in Figs. 1, 2, 4, 5, or 8, or of the walls of angular recesses $d$, $f$, as in Fig. 8, or other modifications may be resorted to in this respect with like result, provided provision is made for suitably contacting with and seating said bolts B, B', at a plurality of places along the lengths of said dolly bar D, and fulcrum bar F.

Bearings $a$, $a'$, are formed in the side walls of the lever socket head $a^x$ (see Fig. 4) for the mounting thereon of the fulcrum bolt B, and the lifting bolt B'; and where the contact shoulders $d$, $f$, are of open form, as in Figs. 1, 2, 5, 6, and 8, these side wall seats $a$, $a'$, may be supplemented by intermediate extensions $a^2$, $a^2$, for a part of the circumference of each bolt (as shown more particularly in Fig. 6) to reinforce and sustain the bolts against the shearing tendency of the lever in action. However if preferred the outer end of the lever socket head $a^x$, may be made open as shown in Figs. 9, and 10, particularly where the seats $d$, $f$, in the dolly bar D, and fulcrum bar F, are circular as in Fig. 9.

The dolly bar D, is provided with the usual or any suitable socket $d'$, for fitting over the previously formed head $r'$, of the rivet $r$,—$r^2$, representing the new head after finishing by the pneumatic hammer or other tool or instrument used for the purpose.

In Fig. 1, my rivet sustaining implement is shown as positioned between flanges of an I beam; while in Fig. 2, its use between any two fixed parts is illustrated, as well as the use of the supplemental extension screw $f'$, which engages with a thread tapped for its reception in one end of the fulcrum bar F, and is provided with a lock nut $f^2$, by which it may be held in a prescribed position or degree of extension.

The fulcrum bolt B, and the lifting bolt B', are obviously essentially coupling pins for connecting respectively, the fulcrum bar F, and the dolly bar D, with the recessed lever head $a^x$, and hence I do not limit myself to the use of screw bolts for this purpose. Cotter pin fastening might be substituted for the screws and nuts shown, or other well known mechanical expedients might be resorted to without departing from the spirit and intent of my invention in this respect. The screw bolts and nuts shown however show operative means for accomplishing the result sought, which is the assembling or disconnecting of the parts in a convenient and expeditious manner, so that the implement may be readily adjusted to the varying requirements of use,—*i. e.*, be increased or diminished in length to fit in between stationary parts for the purpose designated.

The use of the device is very simple. When it is desired to change the combined operative length of the dolly bar D, and fulcrum bar F, either bolt B, or B', or both, is removed from the recessed head $a^x$, of the lever A, thereby permitting the said bars D, and F, to be slid back or forth, the one upon the other, until the appropriate seats $d$, $f$, are brought into coincidence with each other and with the bearings $a$, $a'$, in the side walls of the lever head $a^x$, when the bolt or bolts are replaced, coupling the parts together as seen more particularly in Figs. 6, 7, and 9. The play between the parts is still sufficient to compensate for the thickness of the bolt head $r'$, and admit of positioning the dolly bar D, and fulcrum bar F, as shown in Figs. 1, and 2, when if sufficient downward pressure is applied to the long arm of the lever A, it is evident that the bolt $r$, will be reinforced and sustained during the upsetting of the new bolt head $r^2$.

Where the distance sought to be spanned is too great for the normal (operative) combined length of the dolly bar D, and the fulcrum bar F, the latter may be reversed and the auxiliary extension screw $f'$, utilized as shown in Fig. 2. It is to be understood however that my improved bolt sustaining implement is to be made in various sizes and lengths according to the character and dimensions of the structure on which it is to be employed.

When not desired for active use the parts may be disconnected and packed in compact form for storage or transporation.

What I claim as my invention and desire to secure by Letters Patent is,

1. An implement of the character designated, comprising a dolly bar formed with a socket for contacting with a rivet head and with a series of coupling pin seats, a fulcrum bar formed with a series of coupling pin seats, a lever formed with a recessed head to embrace said dolly bar and said fulcrum bar and with coupling pin bearings in its side walls, coupling pins adapted to engage with the recessed lever head bearings and with the coupling pin seats in the dolly bar and the fulcrum bar, and means for securing said coupling pins in position, for the purpose described.

2. An implement of the character designated, comprising a dolly bar formed with a socket for contacting with a rivet head and with a series of coupling pin seats, a fulcrum bar formed with a series of coupling pin seats, a lever formed with a recessed head to embrace said dolly bar and said fulcrum bar and with coupling pin bearings in its side walls, coupling pins adapted to engage with the recessed lever head bearings and with the coupling pin seats in the dolly bar and the fulcrum bar, and means for securing said coupling pins in position, said recessed head of the lever being also formed with supplementary segmental bearing extensions between the coupling pin bearings in the side walls of said lever head, for the purpose described.

3. An implement of the character designated, comprising a dolly bar formed with a socket for contacting with a rivet head and with a series of coupling pin seats, a fulcrum bar formed with a series of coupling pin seats, an extremity of said fulcrum bar being also formed with a female screw thread, an extension screw engaging therewith and a lock nut thereon, a lever formed with a recessed head to embrace said dolly bar and said fulcrum bar and with coupling pin bearings in its side walls, coupling pins adapted to engage with the recessed lever head bearings and with the coupling pin seats in the dolly bar and the fulcrum bar, and means for securing said coupling pins in position, for the purpose described.

GEORGE McARTHUR.

Witnesses:
GEO. WM. MIATT,
DOROTHY MIATT.

Copies of this patent may be obtained for five cents each, by addressing the "Commissioner of Patents, Washington, D. C."